United States Patent
Fattal et al.

(10) Patent No.: US 9,212,082 B2
(45) Date of Patent: Dec. 15, 2015

(54) SYSTEM AND METHOD FOR FABRICATING OPTICAL FIBER PREFORM AND OPTICAL FIBER

(71) Applicants: Heraeus Quarzglas GmbH & Co. KG, Hanau (DE); Heraeus Tenevo LLC, Buford, GA (US)

(72) Inventors: Georges Levon Fattal, Suwanee, GA (US); Oliver Ganz, Bruchkoebel (DE); Kai Chang, Decatur, GA (US)

(73) Assignees: Heraeus Quarzglas GmbH & Co. KG, Hanau (DE); Heraeus Tenevo LLC, Buford, GA (US)

( * ) Notice: Subject to any disclaimer, the term of this patent is extended or adjusted under 35 U.S.C. 154(b) by 197 days.

(21) Appl. No.: 13/726,906

(22) Filed: Dec. 26, 2012

(65) Prior Publication Data

US 2014/0174134 A1   Jun. 26, 2014

(51) Int. Cl.
C03B 37/012 (2006.01)

(52) U.S. Cl.
CPC ..... *C03B 37/01211* (2013.01); *C03B 37/01245* (2013.01); *C03B 37/01248* (2013.01)

(58) Field of Classification Search
CPC ............... C03B 37/01211; C03B 37/0124; C03B 37/01242; C03B 37/01245; C03B 37/01248
USPC ........................................................... 65/412
See application file for complete search history.

(56) References Cited

U.S. PATENT DOCUMENTS

| | | |
|---|---|---|
| 4,264,347 A | 4/1981 | Shintani et al. |
| 4,668,263 A | 5/1987 | Yokota et al. |
| 4,793,842 A | 12/1988 | Yokota et al. |
| 5,894,537 A | 4/1999 | Berkey et al. |
| 6,044,191 A | 3/2000 | Berkey et al. |
| 6,173,588 B1 | 1/2001 | Berkey et al. |
| 6,434,975 B2 | 8/2002 | Berkey |
| 6,519,974 B1 | 2/2003 | Oh et al. |
| 2003/0145630 A1 | 8/2003 | Hirano et al. |
| 2004/0139765 A1* | 7/2004 | Hirano et al. .................. 65/412 |

(Continued)

FOREIGN PATENT DOCUMENTS

| | | |
|---|---|---|
| DE | 10228599 B4 | 9/2007 |
| EP | 0716047 A2 | 6/1996 |

(Continued)

OTHER PUBLICATIONS

Int'l Search Report and Written Opinion issued Mar. 24, 2014 in Int'l Application No. PCT/US2013/075339.

*Primary Examiner* — Lisa Herring
(74) *Attorney, Agent, or Firm* — Panitch Schwarze Belisario & Nadel LLP

(57) ABSTRACT

A method of manufacturing an optical fiber preform or an optical fiber is provided. The method includes the steps of: (a) providing a glass tube and a glass core rod; (b) inserting the glass core rod into the glass tube to form an assembled body; (c) heating the assembled body to cause the glass tube to collapse on and adhere to the glass core rod; and (d) treating an interface gap between the glass core rod and the glass tube during heating of at least a portion of the assembled body. Treating of the interface gap involves: (i) establishing a vacuum pressure in the interface gap, (ii) increasing a pressure of the interface gap by a treatment gas through the interface gap for a predetermined time, and (iii) re-establishing a vacuum pressure in the interface gap after the predetermined time has elapsed.

25 Claims, 6 Drawing Sheets

(56) References Cited

U.S. PATENT DOCUMENTS

| | | |
|---|---|---|
| 2005/0064188 A1* | 3/2005 | Fletcher et al. ............... 428/375 |
| 2005/0144985 A1 | 7/2005 | Kim et al. |
| 2007/0044516 A1* | 3/2007 | Taru et al. ..................... 65/412 |
| 2008/0107385 A1* | 5/2008 | Ohga et al. .................... 385/123 |

FOREIGN PATENT DOCUMENTS

| | | |
|---|---|---|
| EP | 0501429 B1 | 7/1996 |
| EP | 1440947 B1 | 10/2005 |
| JP | 55-162441 A | 12/1980 |
| JP | 56-073637 A | 6/1981 |
| JP | 60-200204 A | 10/1985 |
| JP | 62-041732 A | 2/1987 |
| JP | 02-160635 A | 6/1990 |
| JP | 06-056453 A | 3/1994 |
| JP | 2004-002140 A | 1/2004 |
| JP | 2004-091302 A | 3/2004 |
| JP | 2005-314179 A | 11/2005 |
| JP | 2010-168243 A | 8/2010 |
| JP | 2010-168244 A | 8/2010 |

* cited by examiner

SYSTEM AND METHOD FOR FABRICATING OPTICAL FIBER PREFORM AND OPTICAL FIBER

BACKGROUND OF THE INVENTION

Optical fibers are fibers that transmit light. Optical fibers are typically made by heating and softening an optical fiber preform in a furnace and then drawing the optical fiber preform to the desired fiber thickness. Optical fiber preforms typically comprise a core rod surrounded by an overclad body. Several conventional systems and methods currently exist for producing such optical fiber preforms and the individual components of the preforms.

Conventional methods for forming the core rod include vapor-phase axial deposition (VAD), outside vapor deposition (OVD), modified chemical vapor deposition (MCVD), and plasma chemical vapor deposition (PCVD). The overclad body may then be formed directly on the exterior surface of the core rod, such as by OVD, or may be formed independently.

A conventional method for forming the overclad body is as follows: starting materials, typically silicon compounds, such as silicon tetrachloride and/or silicon dioxide particles are deposited on a mandrel or substrate by OVD to form a soot deposition body. The deposition continues until the desired body size is attained. After the deposition is completed, the mandrel or substrate is removed. The soot deposition body is then dehydrated and subsequently vitrified in a heating furnace to form a quartz glass cylinder with a bore extending therethrough. Finally, the quartz glass cylinder may be subjected to some manner of machining, such as polishing of the interior and exterior surfaces the cylinder. Such quartz glass cylinders typically have outer diameters of approximately 200 mm and lengths of approximately 3 meters.

The quartz glass cylinder may then be used as an overclad body which is integrated with the core rod to form the optical fiber preform. Conventional methods of forming the optical fiber preform include the Rod-In-Tube (RIT) method and the Rod-In-Cylinder (RIC) method. In the RIT method, the quartz glass cylinder, formed as described above, is drawn down into a plurality of overclad tubes, typically approximately 60 to 90 mm in diameter and approximately 1 to 2 meters in length, which are subsequently integrated with the core rod. In the RIC method, the quartz glass cylinder is used as an overclad cylinder to be integrated with the core rod. Both methods involve inserting the core rod in the quartz glass cylinder or tube, and thus are the same from a technical standpoint. The primary difference between the methods lies merely in the size of overclad tube relative to that of the overclad cylinder.

In the RIT and offline RIC methods, the core rod is inserted into the overclad tube or cylinder and the assembly is heated to a sufficiently high temperature so as to cause the overclad tube or cylinder to collapse on and adhere to the core rod, thereby yielding an optical fiber preform. In the offline RIC method, the assembly is also stretched during collapse of the overclad cylinder onto the core rod in order to form the optical fiber preform. The resulting preforms are then sent to a draw tower for formation of an optical fiber. In the online RIC method, the core rod is inserted into the overclad cylinder and the assembly is heated to a sufficiently high temperature so as to cause the overclad cylinder to collapse on and adhere to the core rod to yield an optical preform, and the resulting preform is immediately drawn to yield an optical fiber in a draw tower.

Typically, the optical fiber preforms produced by these methods have outer diameters of approximately 50 to 210 mm and average lengths of approximately 1,000 to 3,000 mm. Typically, the optical fibers produced by these methods have outer diameters of approximately 90 to 125 μm and average lengths of approximately 1,000 to 10,000 km.

However, with conventional RIT and RIC methods, it is difficult to produce preforms or fibers which are free from irregularities, such as voids, airlines and bubbles, and contaminants, such as various foreign matters. Typically, such irregularities and contaminants exist at the interface between the core rod and the overclad tube/cylinder. Such irregularities and contaminants ultimately negatively impact various properties of the resulting optical fiber, such as increased attenuation and light scattering losses. Accordingly, it would be beneficial to provide improved RIT and RIC systems and methods for producing optical fiber preforms and optical fibers free from contaminants, impurities and atomic defects.

BRIEF SUMMARY OF THE INVENTION

One preferred embodiment of the present invention is directed to a method of manufacturing an optical fiber preform or an optical fiber comprising the steps of: (a) providing a glass tube and a glass core rod; (b) inserting the glass core rod into the glass tube to form an assembled body; (c) heating the assembled body to cause the glass tube to collapse on and adhere to the glass core rod; and (d) treating an interface gap between the glass core rod and the glass tube during heating of at least a portion of the assembled body. Treating of the interface gap comprises: (i) establishing a vacuum pressure in the interface gap, (ii) increasing a pressure of the interface gap by flowing oxygen-enriched air through the interface gap for a predetermined time, and (iii) re-establishing a vacuum pressure in the interface gap after the predetermined time has elapsed.

Another preferred embodiment of the present invention relates to a method of manufacturing an optical fiber preform or an optical fiber comprising the steps of: (a) providing a glass tube and a glass core rod, and (b) inserting the glass core rod into the glass tube to form an assembled body. The assembled body has a first leading end and an opposing second trailing end. The method further comprises: (c) collapsing the glass tube on the glass core rod by heating a length of the assembled body beginning at the first leading end of the assembled body, and (d) treating an interface gap between the glass core rod and the glass tube during collapsing of the glass tube on the glass core rod. Treating of the interface gap comprises: (i) establishing a vacuum pressure in the interface gap during collapsing of the glass tube on the glass core rod proximate the second trailing end of the assembled body, (ii) increasing a pressure of the interface gap by flowing a treatment gas through the interface gap for a predetermined time during collapsing of the glass tube on the glass core rod proximate the second trailing end of the assembled body, and (iii) re-establishing a vacuum pressure in the interface gap during collapsing of the glass tube on the glass core rod proximate the second trailing end of the assembled body.

Advantageous refinements of the invention, which can he implemented alone or in combination, are specified in the dependent claims. Features and details that are described in the context of the optical fiber preform or the optical fiber shall also apply in relation to the method, and vice versa.

In summary, the following embodiments are proposed as particularly preferred in the scope of the present invention:

Embodiment 1: A method of manufacturing an optical fiber preform or an optical fiber, the method comprising the steps of: (a) providing a glass tube and a glass core rod; (b) inserting the glass core rod into the glass tube to form an assembled body; (c) heating the assembled body to cause the glass tube to collapse on and adhere to the glass core rod; and (d) treating a first interface gap between the glass core rod and the glass tube during heating of at least a portion of the assembled body by: (i) establishing a vacuum pressure in the first interface gap, (ii) increasing a pressure of the first interface gap by flowing oxygen-enriched air through the interface gap for a predetermined time, and (iii) re-establishing a vacuum pressure in the first interface gap after the predetermined time has elapsed.

Embodiment 2: The method according to the preceding embodiment, characterized in that the oxygen-enriched air comprises approximately 30% to approximately 50% oxygen.

Embodiment 3: The method according to any one of the two preceding embodiments, characterized in that the oxygen-enriched air comprises approximately 40% oxygen.

Embodiment 4: The method according to any one of the three preceding embodiments, characterized in that an entire length of the assembled body is heated zonewise, the heating beginning at a first leading end of the assembled body and terminating at an opposing second trailing end of the assembled body.

Embodiment 5: The method according to any one of the four preceding embodiments, characterized in that the method further comprises sealing the leading end of the assembled body and establishing a vacuum pressure in the first interface gap prior to heating of the assembled body.

Embodiment 6: The method according to any one of the five preceding embodiments, characterized in that treating of the first interface gap is performed during heating of a portion of the assembled body proximate the first leading end of the assembled body.

Embodiment 7: The method according to any one of the six preceding embodiments, characterized in that treating of the first interface gap is performed during heating of a portion of the assembled body proximate the second trailing end of the assembled body.

Embodiment 8: The method according to any one of the seven preceding embodiments, characterized in that the method further comprises repeating the step of treating the first interface gap.

Embodiment 9: The method according to any one of the eight preceding embodiments, characterized in that the oxygen-enriched air is flowed through the first interface gap for approximately 10 seconds to approximately 5 minutes after the first interface gap pressure reaches approximately 0 millibars gauge.

Embodiment 10: The method according to any one of the nine preceding embodiments, characterized in that the oxygen-enriched air is flowed through the first interface gap for approximately 30 seconds to approximately 3 minutes after the first interface gap pressure reaches approximately 0 millibars gauge.

Embodiment 11: The method according to any one of the ten preceding embodiments, characterized in that the oxygen-enriched air is flowed through the first interface gap for approximately 3 minutes after the first interface gap pressure reaches approximately 0 millibars gauge.

Embodiment 12: The method according to any one of the eleven preceding embodiments, characterized in that the method further comprises providing a glass jacket around the assembled body to form a second interface gap and heating the assembled body and glass jacket to cause the glass jacket to collapse on and adhere to the assembled body.

Embodiment 13: The method according to any one of the twelve preceding embodiments, characterized in that the method further comprises treating the second interface gap during heating by: (i) establishing a vacuum pressure in the second interface gap, (ii) increasing a pressure of the second interface gap by flowing oxygen-enriched air through the interface gap for a predetermined time, and (iii) re-establishing a vacuum pressure in the second interface gap after the predetermined time has elapsed.

Embodiment 14: A method of manufacturing an optical fiber preform or an optical fiber, the method comprising the steps of: (a) providing a glass tube and a glass core rod; (b) inserting the glass core rod into the glass tube to form an assembled body, the assembled body having a first leading end and an opposing second trailing end; (c) collapsing the glass tube on the glass core rod by heating a length of the assembled body beginning at the first leading end of the assembled body; and (d) treating a first interface gap between the glass core rod and the glass tube during collapsing of the glass tube on the glass core rod by: (i) establishing a vacuum pressure in the first interface gap during collapsing of the glass tube on the glass core rod proximate the second trailing end of the assembled body, (ii) increasing a pressure of the first interface gap by flowing a treatment gas through the interface gap for a predetermined time during collapsing of the glass tube on the glass core rod proximate the second trailing end of the assembled body, and (iii) re-establishing a vacuum pressure in the first interface gap during collapsing of the glass tube on the glass core rod proximate the second trailing end of the assembled body.

Embodiment 15: The method according to the preceding embodiment, characterized in that the method further comprises sealing the first leading end of the assembled body and establishing a vacuum pressure in the first interface gap prior to heating of the length of the assembled body.

Embodiment 16: The method according to any one of the two preceding embodiments, characterized in that upon establishment of a vacuum pressure in the first interface gap, gases present in the interface gap are removed.

Embodiment 17: The method according to any one of the three preceding embodiments, characterized in that the treatment gas is at least one of air, dry air, oxygen-enriched air, mixture of pure nitrogen and oxygen, pure oxygen, carbon monoxide, carbon dioxide, hydrogen, methane, ammonia and hydrogen sulfide.

Embodiment 18: The method according to any one of the four preceding embodiments, characterized in that the method further comprises repeating the step of treating the first interface gap.

Embodiment 19: The method according to any one of the five preceding embodiments, characterized in that the treatment gas is flowed through the first interface gap from approximately 10 seconds to approximately 3 minutes after the interface gap pressure reaches approximately 0 millibars gauge.

Embodiment 20: The method according to any one of the six preceding embodiments, characterized in that the treatment gas is flowed through the first interface gap from approximately 30 seconds to approximately 2 minutes after the interface gap pressure reaches approximately 0 millibars gauge.

Embodiment 21: The method according to any one of the seven preceding embodiments, characterized in that the treatment gas is flowed through the first interface gap for approximately 1 minute after the interface gap pressure reaches approximately 0 millibars gauge.

Embodiment 22: The method according to any one of the eight preceding embodiments, characterized in that the step of treating the first interface gap is performed during heating of one half of the length of the assembled body proximate the second trailing end of the assembled body.

Embodiment 23: The method according to any one of the nine preceding embodiments, characterized in that the step of treating the first interface gap is performed during heating of one quarter of the length of the assembled body proximate the second trailing end of the assembled body.

Embodiment 24: The method according to any one of the ten preceding embodiments, characterized in that the step of treating the first interface gap is performed during heating of one third of the length of the assembled body proximate the second trailing end of the assembled body.

Embodiment 25: The method according to any one of the eleven preceding embodiments, characterized in that the method further comprises providing a glass jacket around the assembled body to form a second interface gap and heating the assembled body and glass jacket to cause the glass jacket to collapse on and adhere to the assembled body.

Embodiment 26: The method according to any one of the twelve preceding embodiments, characterized in that the method further comprises treating the second interface gap during heating by: (i) establishing a vacuum pressure in the second interface gap, (ii) increasing a pressure of the second interface gap by flowing oxygen-enriched air through the interface gap for a predetermined time, and (iii) re-establishing a vacuum pressure in the second interface gap after the predetermined time has elapsed.

BRIEF DESCRIPTION OF THE DRAWINGS

The foregoing summary, as well as the following detailed description of preferred embodiments of the present invention, will be better understood when read in conjunction with the appended drawings. For the purpose of illustration, there is shown in the drawings embodiments which are presently preferred. It should be understood, however, that the device and method are not limited to the precise arrangements and instrumentalities shown.

In the drawings.

DETAILED DESCRIPTION OF THE INVENTION

The present invention relates to a system and method for producing optical fiber performs or optical fibers. It will be understood by those skilled in the art that the preforms produced from the below described system and methods may be utilized for various other purposes than for fabricating an optical fiber. More particularly, the present invention relates to a method for producing an optical fiber preform or an optical fiber which is substantially free of undesirable irregularities, visual defects, contaminants, metallic impurities, atomic defects and the like. The present invention also results in reduced attenuation in an optical fiber to be drawn from the preform.

It will be understood that, in the context of this application, the terms "about" or "approximately" mean a variation of ±5% of the recited or claimed values, and more preferably a variation of ±2% of the recited or claimed values, and most preferably the exact recited or claimed values.

Since the treatment processes of the present invention may be applied to conventional optical fiber preform or optical fiber production methods, a typical perform/fiber production will be described with reference to FIGS. 1 and 2. However, it will be understood by those skilled in the art that the treatment processes of the present invention may also be adapted to other perform/fiber production methods.

Figure 1:
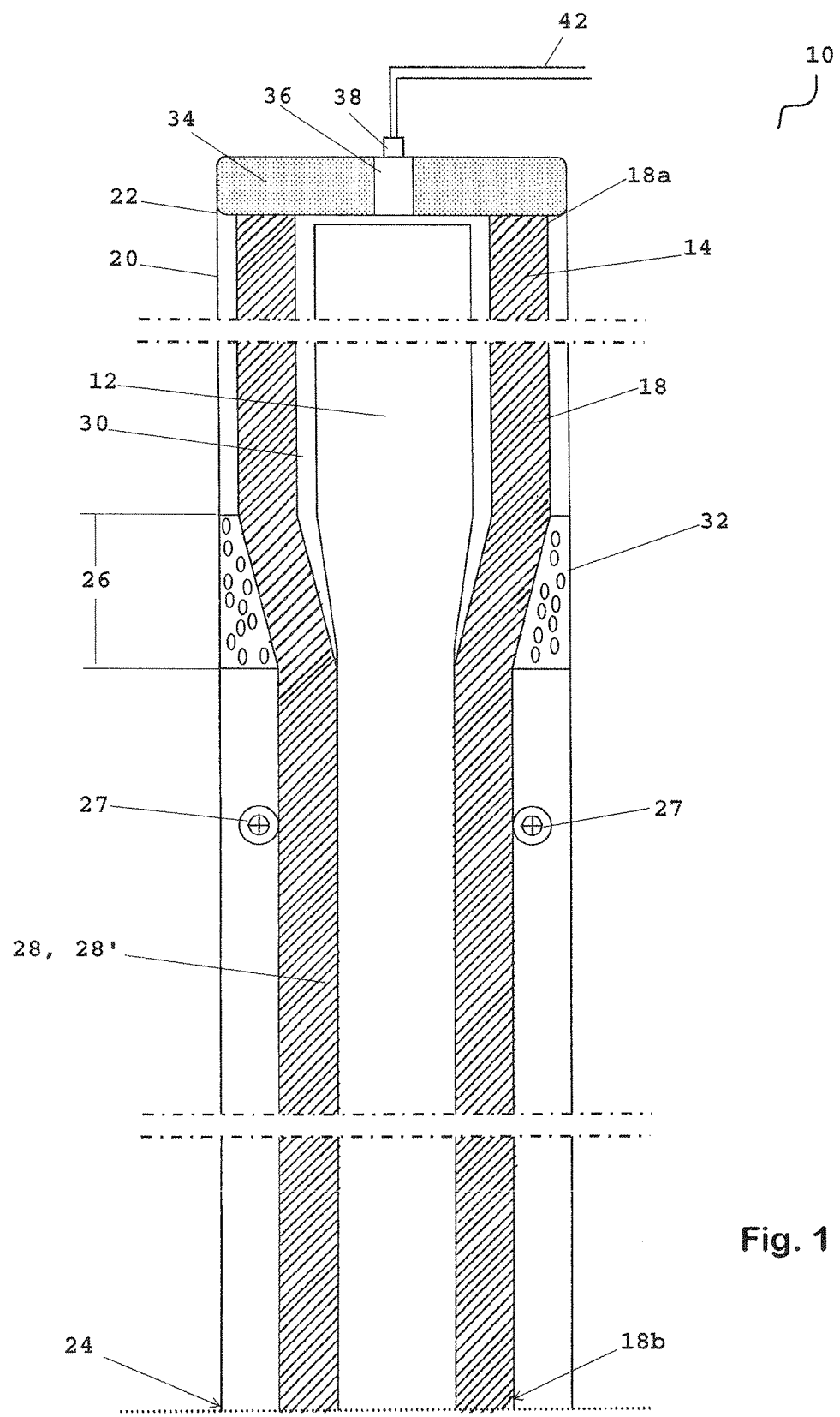
FIG. 1 is a partial cross-sectional view of a system for producing an optical fiber preform or an optical fiber in accordance with one embodiment of the present invention.

Referring to FIG. 1, there is shown a system 10 for producing an optical fiber perform or, alternatively, for directly producing an optical fiber. The system 10 includes a vertically arranged drawing tower 20 which can be heated to temperatures of approximately 1,500° C. to approximately 2,300° C., a heating element 32, and a gas supply system 40 (see FIG. 3). Referring to FIG. 2, in the drawing process, a core rod 12 is inserted into an overclad body 14. The core rod 12 is preferably a solid rod of a generally cylindrical configuration. The overclad body 14 is preferably an overclad cylinder (for RIC methods) or an overclad tube (for RIT methods) having a bore 16 formed through the center of the body 14.

As described above, the RIC and RIT methods are essentially the same from a technical standpoint. Accordingly, for purposes of convenience and simplicity in the description of the system and methods, the overclad body 14 will be referred to hereinafter as an overclad tube 14 with the understanding that the overclad body 14 may be a cylinder for use in offline RIC systems and methods for making an optical fiber preform 28 or in online RIC systems and methods for making an optical fiber 28', or may be a tube for use in RIT systems and methods for making an optical fiber preform 28.

The overclad tube 14 is preferably a glass tube, and more preferably a quartz glass tube. The glass tube 14 may be made of pure quartz glass or a quartz glass composite. Preferably, the glass tube 14 is made of pure quartz glass. The core rod 12 is preferably a glass rod, and more preferably a pure quartz glass with a uniform or a complex radial refractive index profile.

Figure 2A:
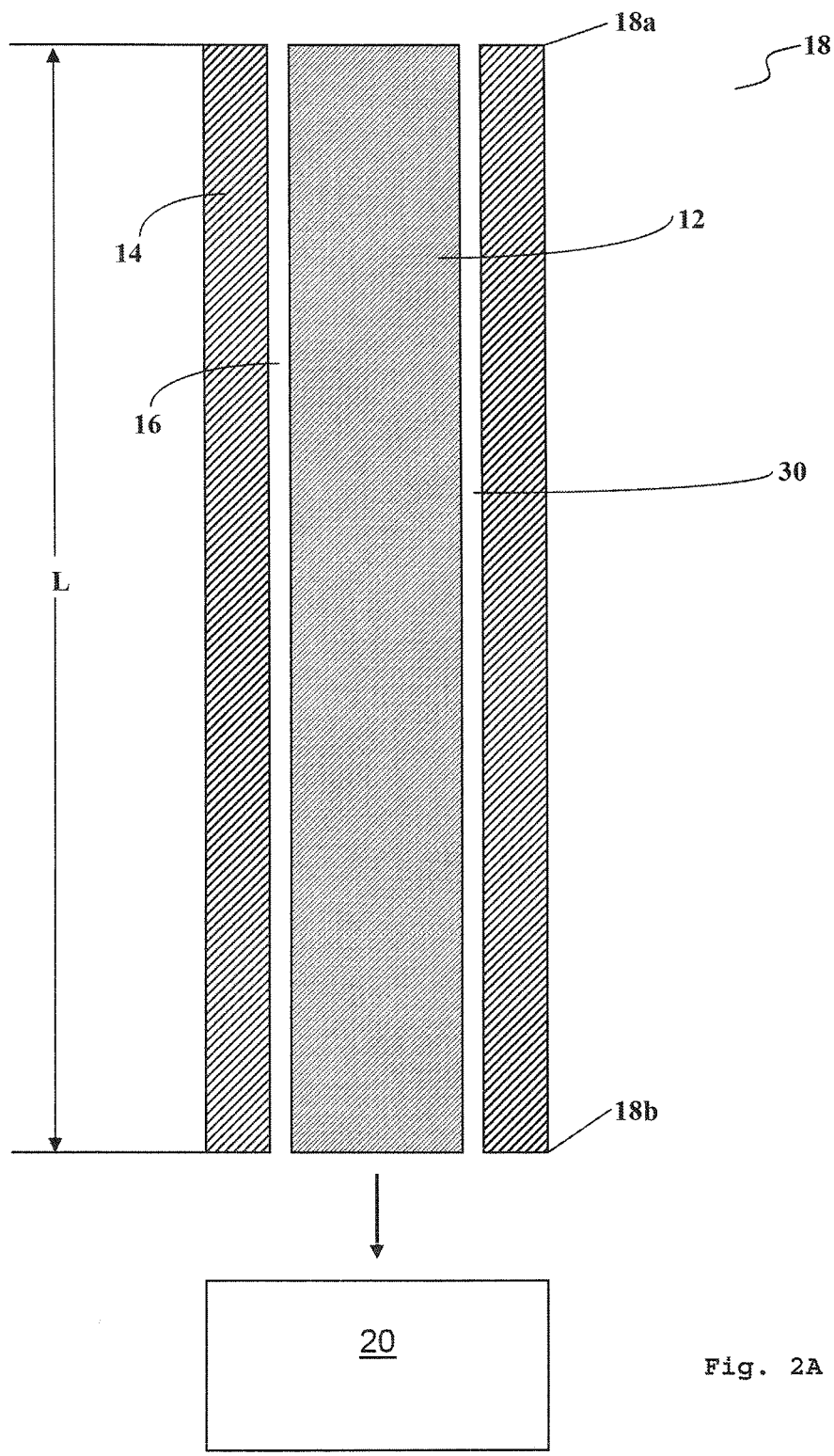
FIG. 2A is a cross-sectional view of an assembled body used to produce an optical fiber preform or an optical fiber in accordance with one embodiment of the present invention.

Referring to FIGS. 1-2, the core glass rod 12 is inserted within the bore 16 of the quartz glass tube 14 to form an assembled body 18 which is subjected to heating for formation of an optical fiber preform 28 or an optical fiber 28'. The assembled body 18 is of a generally cylindrical or tubular configuration and has a length L which extends from a first or upper end 18a of the body to a second or lower end 18b of the body. Also, a slight first gap 30 remains in the interface between the core rod 12 and the overclad tube 14, and more particularly between an outer surface of the core glass rod 12 and an inner surface of the overclad glass tube 14 (see FIG. 2). The size of the first interface gap 30 may vary depending on the relative sizes of the core rod 12 and the overclad tube 14, but is typically up to approximately 6 mm. Preferably, the first interface gap 30 is equipped with a pressure sensor (not shown) for continuous or intermittent monitoring of the pressure of the gap.

In one embodiment, a thin walled jacket 62 is provided to surround the assembled body 18, such that a second interface gap 64 is formed between an outer surface of the overclad glass tube 14 and an inner surface of the jacket 62. The jacket is preferably a glass tube, and more preferably a quartz glass tube. The jacket may be made of pure quartz glass or a quartz glass composite. Preferably, the jacket is made of pure quartz glass.

The method for producing an optical fiber preform 28 or an optical fiber 28' (i.e., the RIC or RIT process) comprises continuously supplying the assembled body 18 to a drawing tower 20 and heating the assembled body therein in zone-wise manner. For purposes of the production method, and more particularly for purposes of the assembled body's progress through the drawing tower 20, the lower end 18b of the assembled body is a leading end and the upper end 18a of the assembled body is a trailing end, such that the assembled body progresses in a downward direction through the drawing tower. However, it will be understood that the opposition configuration and progression is also possible. That is, in an alternative embodiment, the upper end 18a of the assembled body in a leading end and the lower end 18b is a trailing end, such that the assembled body progresses in an upward direction through the drawing tower.

In one embodiment, the assembled body 18 is fed to a vertically-oriented drawing tower 20, such as a vertically-oriented lathe, for manufacturing the preform 28 or optical fiber 28' (see FIG. 1). It will be understood by those skilled in the art that any conventional vertically-oriented drawing apparatus may be used for formation of the optical fiber preform or the optical fiber, provided that the apparatus is equipped with a heating element as described below.

Figure 2B:
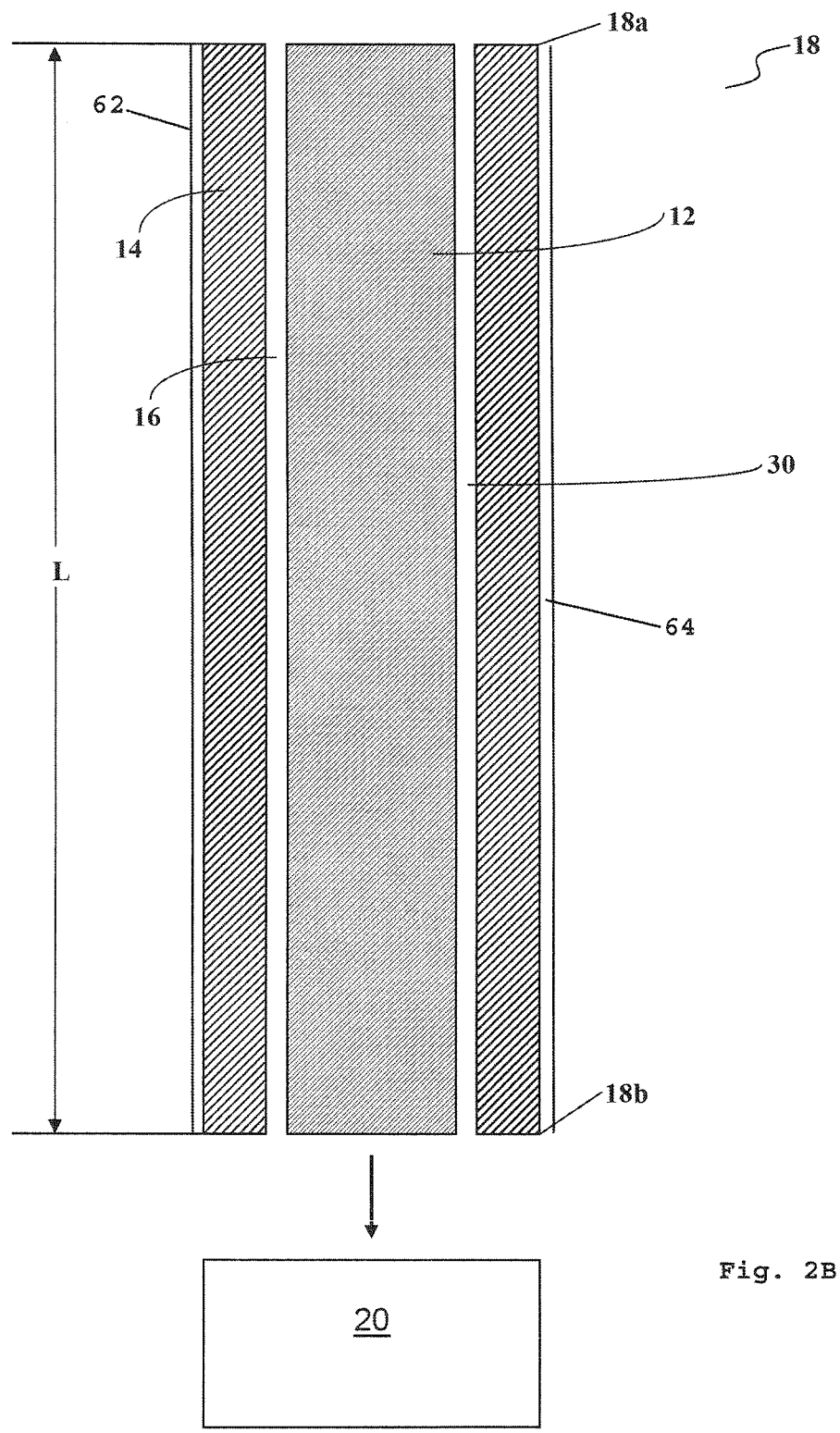
FIG. 2B is a cross-sectional view of an assembled body surrounded by a jacket used to produce an optical fiber preform or an optical fiber in accordance with one embodiment of the present invention.

Referring to FIGS. 1-2B, the assembled body 18 preferably enters an upper open end 22 of the drawing tower 20 and the resulting preform 28 or optical fiber 28' exits an opposing lower open end 24 of the drawing tower 20. More particularly, the lower end 18b of the assembled body 18 is preferably positioned in a stable manner at the upper open end 22 of the drawing tower 20 at the start of an RIT, offline RIC or online RIC preform/fiber manufacturing process, and a preform 28 or fiber 28' is continuously drawn out from the lower open end 24 by melt deformation and optionally stretching by gravitational force during the drawing process. The production method is complete when the upper end 18a of the assembled body 18 has exited the drawing tower 20 as a preform 28 or fiber 28'. The drawing tower 20 preferably includes a plurality of braking wheels 27 to slow down movement of the perform/fiber (see FIG. 1).

As the assembled body 18 progresses from the upper open end 22 of the drawing tower 20 toward the lower open end 24, the core rod 12 and the overclad tube 14 are heated by a heating element 32 to a predetermined temperature sufficient to cause the two components to soften and fuse together to form a monolithic body. The heating element 32 is preferably of a generally annular configuration and is positioned within or around the drawing tower so as to form a hot zone 26 of the drawing tower.

At the start of the drawing process or run, as the assembled body 18 descends through the drawing tower 20 and approaches the hot zone 26, the lower end (i.e., the leading end) 18b of the assembled body begins to be heated. As the lower end 18b of the assembled body 18 approaches the hot zone 26 and reaches a first temperature, the overclad glass tube 14 and the core rod 12 begin to soften and the softened overclad glass tube 14 begins to collapse on the core rod 12, such that the size of the first interface gap 30 is reduced (see FIG. 1). If a thin walled jacket 62 is present, the size of the second interface gap 64 is similarly reduced (see FIG. 2B). Preferably, softening and collapsing of the overclad tube 14 on the core rod 12 occurs at a temperature of approximately 1,600° C.-2,200° C. More preferably, softening and collapsing of the overclad tube 14 on the core rod 12 occurs at a temperature of approximately 1,600° C.-1,700° C. However, it will be understood by those skilled in the art that other factors, such as run time and throughput, also affect when the overclad tube 14 begins to collapse on the core rod 12.

In one embodiment, at the beginning stages of the drawing process/run, a portion of the softened area at the lower end 18b of the assembled body 18 preferably begins to form a start piece or drop piece (not shown). The start or drop piece is subsequently pinched closed to seal the lower end 18b of the assembled body 18.

As the assembled body 18 continues to progress through the drawing tower 20, the lower end 18b of the assembled body subsequently enters the hot zone 26. In the hot zone 26, the lower end 18b is heated to a second temperature, higher than the first temperature, at which the softened glass of the collapsed overclad glass tube 14 begins to adhere to the softened glass of the core rod 12. As such, in the hot zone 26 of the drawing tower 20, the core rod 12 and the overclad glass tube 14 begin to fuse together to begin forming the preform 28 or fiber 28'. Preferably, adhering of the softened collapsed overclad tube 14 to the softened core rod 12 occurs at a temperature of approximately 1,600° C.-2,200° C. More preferably, adhering of the softened collapsed overclad tube 14 to the softened core rod 12 occurs at a temperature of approximately 1,800° C.-2,200° C. However, it will be understood by those skilled in the art that other factors, such as run time and throughput, also affect the stage at which the collapsed overclad tube begins to adhere to the core rod.

As the entire length L of the assembled body 18 progresses through the drawing tower 20, every portion of the assembled body is heated in this zone-wise manner. Specifically, during the drawing process/run, consecutive portions of the overclad glass tube 14 are continuously heated and collapsed on corresponding portions of the core glass rod 12, as these portions approach the hot zone 26 and are heated to the first temperature. Subsequently, as these consecutive portions of the overclad glass tube 14 and the core rod 12 enter the hot zone 26 and are heated to the second higher temperature, the softened and collapsed overclad glass tube and the softened glass core rod adhere to each other and fuse together for continuous formation of the preform 28.

According to embodiments of the present invention, as portions of the overclad tube 14 collapse on the core glass rod 12, the assembled body 18 is preferably subjected to a treatment process in order to eliminate or reduce the presence of organic and inorganic contaminants and defects, such as interface bubbles and air lines, present in the interface gap 30 between the core rod 12 and the overclad tube 14 (or the interface gap 64 between the overclad tube 14 and the thin walled jacket 62). The treatment process comprises cycling the pressure of one or both of the interface gaps 30, 64, either continuously throughout the drawing process/run or only at select stages of the drawing process/run. More particularly, as described in greater detail hereinafter, the interface gap pressure is cycled a repeated number of times or continuously throughout the drawing process during collapsing of the overclad tube 14 on the core rod 12, by intermittently drawing a vacuum to evacuate gases from one or both of the interface gaps 30, 64 (i.e., decreasing the pressure) and providing one or more gases to the interface gap (i.e., increasing the pressure).

The particular steps of the treatment process and the equipment used to perform steps these will now be described in detail. For purposes of simplicity, the below description refers only to treatment of the first interface gap 30 between the core rod 12 and the overclad tube 14. However, it will be understood by those skilled in the art that, in situations where a thin walled jacket 62 is provided to surround the assembled body 18, the same treatment process may be utilized for treatment of the second interface gap 64 between the overclad tube 14 and the thin walled jacket 62.

Referring to FIG. 1, the upper end 18a of the assembled body 18 is preferably secured or attached to a handle 34. The handle 34 is preferably of a sufficient size so as to completely cover the upper end 18a of the assembled body 18. In one embodiment, the handle 34 preferably has a circular cross-sectional shape and a diameter equal to or larger than that of the assembled body 18. More particularly, in use, the upper end 18a of the assembled body 18 is completely closed or covered by the handle 34. It will be understood by those skilled in the art that while the term handle is used hereinafter for illustrative purposes, any appropriate descriptive term, such as lid, cover plug, collar, endcap, and the like, may be utilized for purposes of identifying the handle-like component.

The handle 34 includes an aperture or bore 36 which extends through the body of the handle. Preferably, the bore 36 is generally located at the geometric center of the handle 34. However, it will be understood by those skilled in the art that the bore 36 may be located at any position within the body of the handle 34, such as at a position generally aligned with the interface gap 30. A gas adapter 38 is preferably secured to the bore 36 of the handle 34, such that the bore serves as a port for the supply and evacuation of gases from the assembled body 18.

The gas adapter 38 is preferably sealingly engaged to or within the bore 36 of the handle 34. In one embodiment, a gasket (not shown) is preferably disposed between an outer periphery of the gas adapter 38 and an inner periphery of the bore 36 of the handle 34, so as to ensure a sufficient seal between the adapter and the handle. The use of a gasket also ensures that no unwanted gases can enter the interface gap 30 though the bore 36 and that no desirable gases can exit the interface gap though the bore. The gasket is preferably made of a rubber configured to withstand high temperatures, such as a high temperature-resistant Teflon material.

The gas adapter 38 is preferably configured to facilitate the supply of one or more gases into the assembled body 18 and also to facilitate the application of a vacuum in the assembled body. More preferably, at certain periods throughout the drawing process/run, the gas adapter 38 enables one or more gases to be supplied to the interface gap 30 between the core rod 12 and the overclad tube 14 of the assembled body 18, while at other periods throughout the process, the gas adapter enables the application of a vacuum to the interface gap and the evacuation of any gases present therein.

Figure 3:
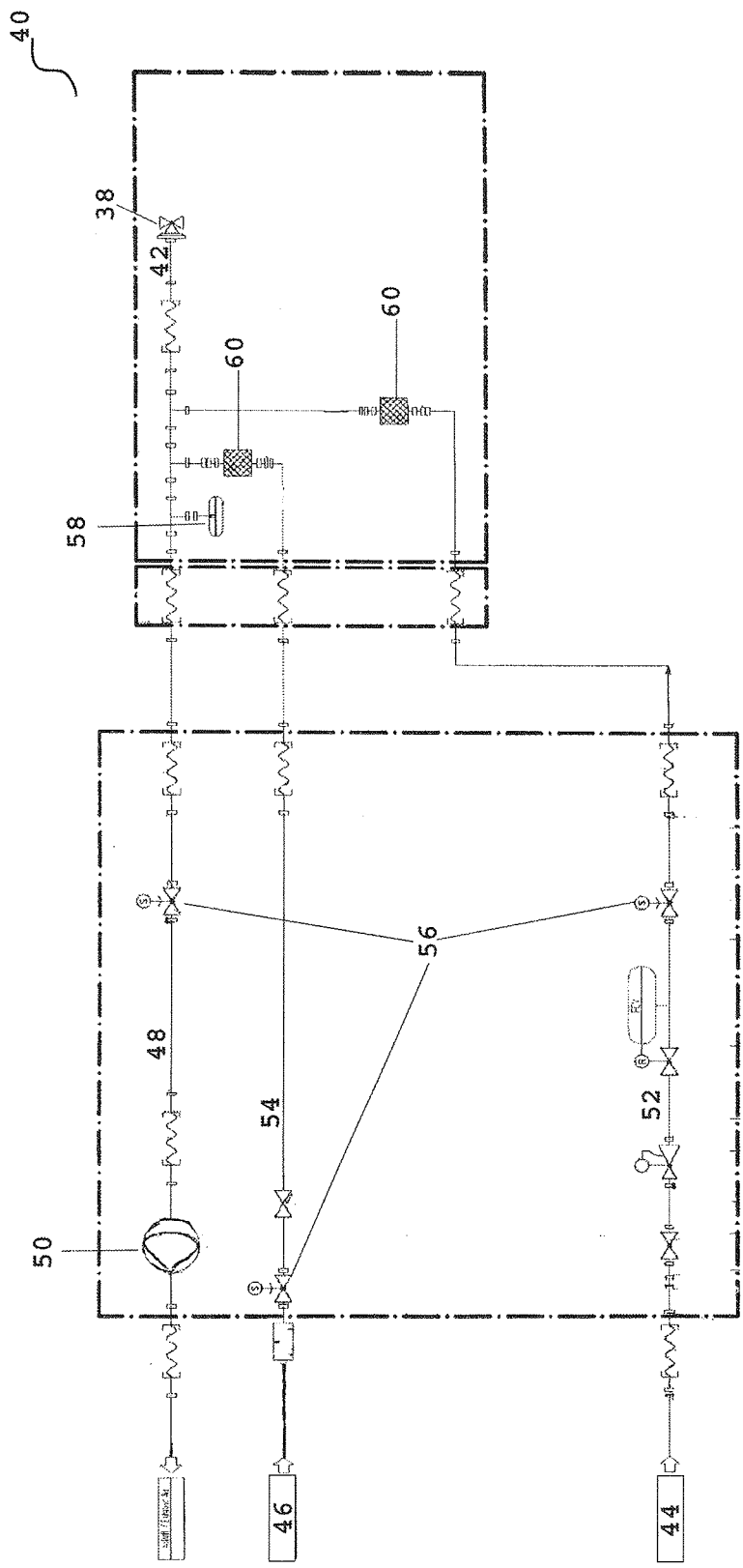
FIG. 3 is a schematic representation of a portion of the system for producing an optical fiber preform or an optical fiber in accordance with one embodiment of the present invention.

Referring to FIG. 3, the gas adapter 38 is part of a gas supply system 40. More particularly, in one embodiment, the gas supply system 40 comprises a main gas line 42 which is connected to the gas adapter 38. Preferably, the main gas line 42 comprises a plurality of connected and fitted flexible or rigid hoses, tubes or pipes. The hoses, tubes and/or pipes of the main gas line 42 are each preferably made of a corrosion resistant material. In a preferred embodiment, the main gas line 42 comprises a plurality of interconnected and fitted silicone rubber hoses and stainless steel pipes. However, it will be understood by those skilled in the art that the main gas line 42 may comprise a single integrally formed pipeline. Preferably, one end of the main gas line 42 is sealingly connected to the gas adapter 38.

Referring to FIG. 3, the main gas line 42 is preferably connected to and supplied by at least two different gas sources. In one embodiment, the main gas line 42 is supplied by a first source 44 of a purge gas and a second source 46 of a treatment gas. Preferably, the purge gas is at least one substantially inert gas, such as nitrogen, helium, argon, or mixtures thereof. The purge gas is preferably supplied to the main gas line 42 from the first source 44 via a purge gas line 52, one end of which is connected to the purge gas source and the other end of which is connected to the main gas line.

The treatment gas is preferably an oxidizing gas or a reducing gas, as described more fully herein. The treatment gas is preferably supplied to the main gas line 42 from the second source 46 via a treatment gas line 54, one end of which is connected to the treatment gas source and the other end of which is connected to the main gas line. Similar to the main gas line 42, the purge gas line 52 and the treatment gas line 54 each preferably comprises a plurality of connected and fitted flexible and rigid hoses, tubes or pipes, although it will be understood that each line may comprise a single integrally formed pipeline.

The gas supply system 40 also preferably comprises an evacuation line 48, one end of which is connected to a vacuum source 50, such as a vacuum pump, and the other end of which is connected to the main gas line 42. The vacuum source 50 facilitates the evacuation of any gases present in the interface gap 30 of the assembled body 18 via the main gas line 42 and the evacuation line 48.

In one embodiment, the purge gas supply line 52, the treatment gas supply line 54 and the evacuation line 48 are all preferably connected to the main gas line 42 via a gas manifold system, such that gases can be supplied to and evacuated from the assembled body 18 via a single port, and more particularly via the bore 36 formed in the handle 34.

In another embodiment, the main gas line 42 and the evacuation line 48 are the same pipeline, such that one end of the main gas/evacuation pipeline is connected to the vacuum source 50 and an opposing end of the main gas/evacuation pipeline is connected to the gas adapter 38. In such a configuration, the purge gas supply line 52 and the treatment gas supply line 54 are connected to the main gas/evacuation line via a gas manifold system, and gases can be supplied to and evacuated from the assembled body 18 via the bore 36 formed in the handle 34.

Preferably, the evacuation line 48, the purge gas supply line 52, and the treatment gas supply line 54 are each provided with a flow control valve 56. More preferably, each of the lines 48, 52, 54 is provided with a solenoid valve 56 for flow control. A pressure gauge 58 is preferably provided on the main gas line 42 and is in operative communication with the pressure sensor monitoring the pressure of the interface gap 30. As such, the gas supply is preferably effected by measuring the fluctuation of the gas pressure using the pressure sensor provided in the interface gap 30, and then supplying gas based on the measured values. At least the purge gas supply line 52 and the treatment gas supply line 54 are also preferably each provided with a filter membrane 60 and a flow meter, such as a mass flow controller or simply a needle valve, for measuring and controlling the flow rate of the gas.

Every component of the gas supply system 40 is preferably operatively controlled by a central controller (not shown). More particularly, operation of the purge gas supply line 52, the treatment gas supply line 54 and the evacuation line 48 is controlled by the controller. However, it will be understood by those skilled in the art that the gas supply system 40 may be manually controlled by an operator monitoring the pressure measurements of the interface gap 30.

In one embodiment of the treatment process, before the assembled body 18 begins to progress through the drawing tower 20, a portion of the lower end 18b of the assembled body 18 is sealed off. A spoon or cover (not shown) is then provided on the handle 34 and a vacuum is applied to the assembled body prior to the body being introduced into the drawing tower.

In another embodiment, no such sealed portion is formed prior to heating. Instead, a start or drop piece of the assembled body 18 is pinched closed for sealing of the lower leading end 18b during heating in the tower 20. However, before the start or drop piece of the assembled body 18 is pinched closed for sealing of the lower leading end 18b, a positive flow of the purge gas is optionally supplied from the purge gas source 44, through the purge gas supply line 52 and the main gas line 42 to the interface gap 30. In this optional step, at the beginning stages of the drawing process/run, the control valves for the evacuation line 48 and the treatment gas supply line 54 are in closed positions, while the control valve for the purge gas supply line 52 is in an open position.

The purge gas is preferably supplied to the interface gap 30 at a predetermined flow rate and predetermined pressure. Preferably, the purge gas is supplied at a flow rate of up to approximately 10 liters per minute at a system back pressure or head pressure, created by the assembled body 18, of up to approximately 20 millibars. More preferably, the purge gas is supplied at a flow rate of approximately 1 to 5 liters per minute at a system back pressure of up to approximately 10 millibars. Most preferably, the purge gas is supplied at a flow rate of approximately 1.5 liters per minute at a system back pressure of approximately 3 millibars. In a preferred embodiment, the purge gas is nitrogen.

After the start/drop piece is pinched off, such that the lower leading end 18b of the assembled body 18 is sealed off, and purge gas flows through the interface gap 30, the interface gap pressure begins to increase. Once the interface gap pressure reaches a first pressure set point, the controller switches from a purge flow control mode to a vacuum control mode. More specifically, once the pressure in the gap 30 reaches approximately 20 to 40 millibars, and more preferably approximately 25 millibars, the controller prompts the control valve for the purge gas supply line 52 to switch from the open position to the closed position, such that the supply of the purge gas is terminated.

Figure 4:
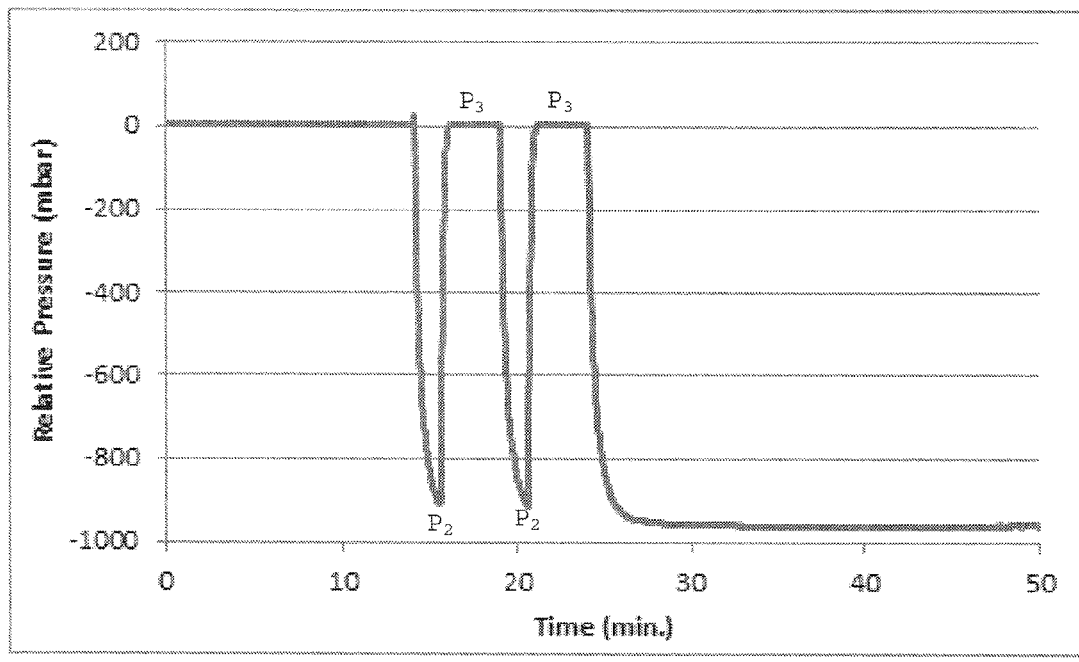
FIG. 4 is a graphical representation of the treatment steps for producing an optical fiber preform or an optical fiber in accordance with one embodiment of the present invention.
Figure 5:
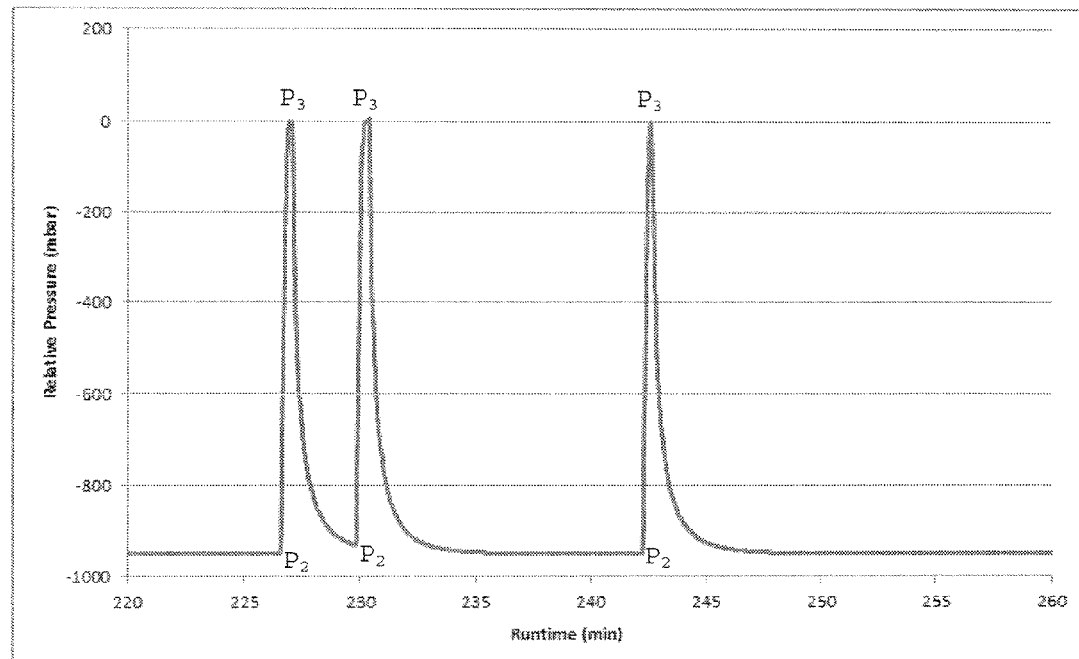
FIG. 5 is a graphical representation of the treatment steps for producing an optical fiber preform or an optical fiber in accordance with another embodiment of the present invention.

Generally simultaneously, the controller prompts the control valve for the main gas line 42 to switch to the open position and prompts the vacuum source 50 to commence operation, thereby drawing a vacuum and reducing the pressure in the interface gap 30 until a second pressure set point, shown as $P_2$ on FIGS. 4 and 5, is reached. The second pressure set point is a predetermined negative (vacuum) pressure.

This initial vacuum causes all gases present in the interface gap 30, as well as any gases present in the headspace of the handle 34, to be evacuated or sucked out of the gap via the main gas line 42 and the evacuation line 48. Establishing an initial vacuum pressure in the interface gap 30 at this stage of the drawing process also facilitates collapse of the overclad glass tube 14 onto the core rod 12 of the assembled body 18, particularly in the area of the assembled body approaching the heating element 32.

Accordingly, the treatment process commences by first flowing a purge gas through the interface gap, thereby increasing the interface gap pressure, and subsequently drawing a vacuum on the interface gap, thereby decreasing the interface gap pressure and evacuating or discharging the purge gas and any reaction products from the interface gap. However, it will be understood by those skilled in the art that the step of supplying the interface gap 30 with a purge gas is optional.

Figure 6:
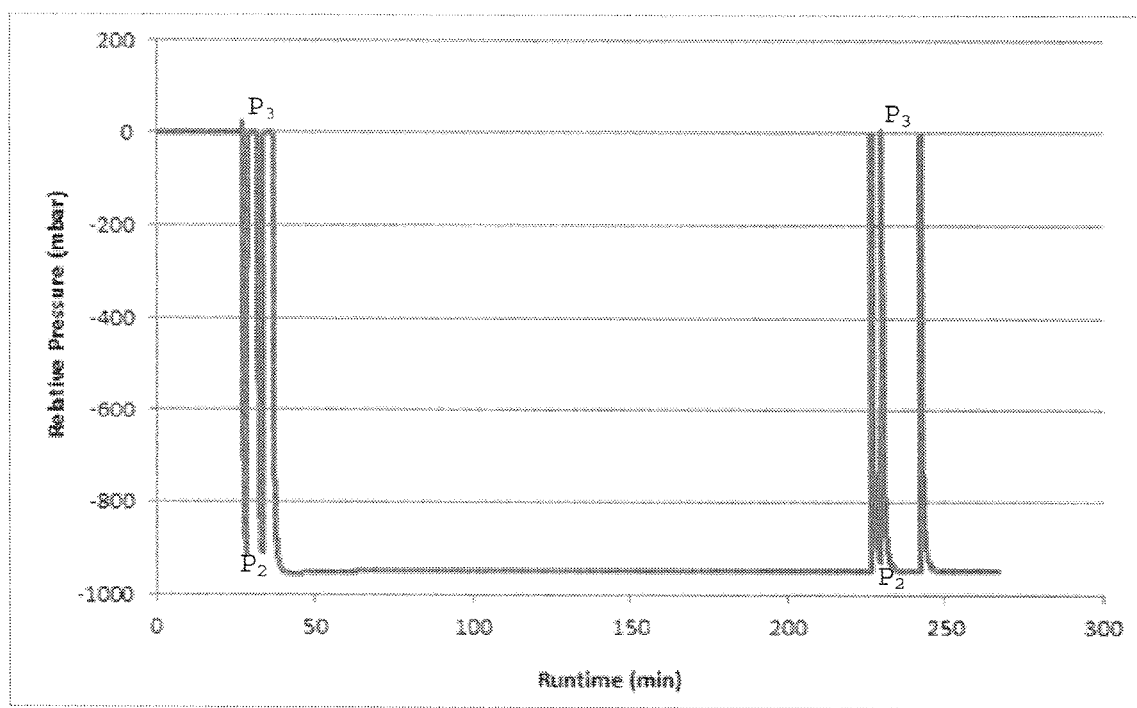
FIG. 6 is a graphical representation of the treatment steps for producing an optical fiber preform or an optical fiber in accordance with another embodiment of the present invention.

Accordingly, in one embodiment, the treatment process commences by drawing an initial vacuum once the lower leading end 18b of the assembled body 18 is sealed off, thereby decreasing the pressure of the interface gap 30 to the predetermined nominal vacuum pressure (i.e., the second pressure set point $P_2$) and causing any gases present therein to be evacuated or discharged. Referring to FIGS. 4-6, the second pressure set point $P_2$ is preferably a nominal vacuum pressure of approximately −800 to −950 millibars, and more preferably approximately −900 to −930 millibars, and most preferably approximately −930 millibars (approximately 80 to 90 millibars absolute) or lower.

Upon reaching the desired vacuum pressure, the controller switches from the vacuum control mode to a treatment flow control mode, in which the treatment gas is flowed through the interface gap 30 to increase the pressure of the gap and react with contaminants present therein (see FIGS. 4-6). In the treatment flow control mode, the control valve for the evacuation line 48 switches to the closed position, the vacuum source 50 preferably ceases operation, the control valve for the purge gas supply line 52 remains in the closed position, and the control valve for the treatment gas supply line 54 switches to the open position.

In one embodiment, the treatment gas is an oxidizing gas, such as standard air, dry air, oxygen-enriched air, a mixture of pure nitrogen and oxygen, pure oxygen, or mixtures thereof. In another embodiment, the treatment gas is a reducing gas, such as carbon monoxide, carbon dioxide, hydrogen, hydrogen-rich gases such as methane, ammonia and hydrogen sulfide, or mixtures thereof.

Oxidizing gases are particularly beneficial for use as the treatment gas when undesirable organic contaminants are present in the interface gap 30, as the oxidizing gases react with and cause combustion of the organic contaminants. Both oxidizing and reducing gases are particularly beneficial for use as the treatment gas in order to effect a change in the oxidation state of metallic impurities or atomic species present in the interface gap 30 in undesirable oxidation states, such as such as $Fe^{2+}$, $Cu^{2+}$, and $Ni^{2+}$.

In one embodiment, the treatment gas is preferably standard air or oxygen. In another embodiment, the treatment gas is preferably oxygen-enriched air with an oxygen content of approximately 30% to 50%, and more preferably approximately 40%. In another embodiment, the treatment gas is preferably carbon monoxide.

The treatment gas is supplied to the assembled body 18, and more particularly to the interface gap 30, as the overclad tube 14 is being heated and collapsed on the core rod 12. Thus, the treatment gas flows through the interface gap 30 during collapsing of the overclad tube 14 on the core rod 12.

As the treatment gas is supplied to the interface gap 30, the pressure of the interface gap begins to rise from the vacuum pressure of the second pressure set point $P_2$ (preferably approximately −930 millibars) toward a third pressure set point $P_3$ (see FIGS. 4-6). The treatment gas is preferably flowed through the interface gap at a predetermined flow rate until the third pressure set point $P_3$ is reached. Oxidation/reduction of the contaminants typically begins once a pressure of approximately −900 millibars is reached.

Preferably, the treatment gas is supplied at a flow rate of up to approximately 20 liters per minute until the interface gap pressure reaches approximately −10 to 5 millibars. More preferably, the treatment gas is supplied at a flow rate of approximately 1 to 10 liters per minute until the interface gap pressure reaches approximately −5 to 5 millibars. Most preferably, the treatment gas is supplied at a flow rate of approximately 1 to 10 liters per minute until the interface gap pressure reaches the third pressure set point $P_3$ of approximately 0 millibars (gauge). It will be understood that approximately 0 millibars or approximately 0 millibars gauge is equal or equivalent to atmospheric pressure.

Once the pressure of the interface gap 30 has reached the third pressure set point $P_3$ (preferably approximately 0 millibars), the flow rate of the treatment gas is preferably adjusted such that the interface gap pressure is held at 0 millibars. The treatment gas continues to be supplied at such an adjusted flow rate for a predetermined period of time.

In one embodiment, after the interface gap pressure reaches approximately 0 millibars, the treatment gas is preferably supplied to the interface gap 30 at an adjusted flow rate for approximately 10 seconds to approximately 5 minutes, more preferably for approximately 30 seconds to approximately 3 minutes, and most preferably for approximately 3 minutes. In another embodiment, after the interface gap pressure reaches approximately 0 millibars, the treatment gas is preferably supplied to the interface gap for a relatively shorter duration, preferably for approximately 10 seconds to approximately 3 minutes, more preferably for approximately 30 seconds to approximately 2 minutes, and most preferably for approximately 1 minute.

After the predetermined time period for supply of the treatment gas has elapsed (i.e., once a desired degree of oxidation or reduction of the contaminants has been achieved), the controller switches from the treatment flow control mode back to the vacuum control mode, in which the supply of the treatment gas is terminated and the vacuum source 50 commences operation to decrease the pressure of the interface gap 30 and re-establish a vacuum pressure therein. The vacuum also causes all gases present in the interface gap 30, such as combustion gases produced by the reaction of the treatment gas and organic contaminants, to be evacuated or sucked out of the gap via the main gas line 42 and the evacuation line 48.

Thus, the treatment process involves cycling of the interface gap pressure by intermittently drawing a vacuum to evacuate gases from the interface gap 30 (i.e., decreasing the pressure), providing a treatment gas to the interface gap (i.e., increasing the pressure), drawing a vacuum to re-establish a vacuum pressure and evacuate reaction products from the interface gap (i.e., decreasing the pressure), and so on. In one embodiment, once the vacuum pressure is re-established for a first time, the treatment process is complete and drawing of the assembled body 18 to a preform 28 or fiber 28' continues under vacuum.

In another embodiment, once the desired vacuum pressure is re-established for the first time, cycling of the interface gap pressure is repeated. Specifically, the controller switches back to the treatment flow control mode, wherein the treatment gas is flowed through the interface gap 30 at the above-described parameters. Then, after a predetermined time period for supplying of the treatment gas has elapsed, the controller once again switches back to the vacuum control mode to re-establish the desired vacuum pressure for a second time. The controller may then either switch back to the treatment flow control mode for additional treatment or may remain in the vacuum control mode, signaling that the treatment process is complete and that drawing of the assembled body 18 should continue under vacuum.

In one embodiment, the treatment process (i.e., cycling of the interface gap pressure) is performed at a beginning stage of the drawing process/run, after the drop piece has been formed and pinched off. Preferably, the beginning stage of the drawing process/run corresponds to a point in the drawing process/run at which a first half of the assembled body 18 is proximate to and passing through the hot zone 26 of the drawing tower 20. While the treatment gas flows through the interface gap 30 along the entire length L of the assembled body 18, cycling of the interface gap pressure during the beginning of the drawing process/run has been found to result in significantly improved optical fiber preforms or optical fibers, since visual defects such as air bubbles in preforms or airlines in drawn fibers tend to be heavy during the beginning of the drawing process/run.

More particularly, in such an embodiment, cycling of the interface gap pressure is preferably carried during heating of the half of the length L of the assembled body proximate the lower and leading end 18b. That is, the interface gap pressure is preferably cycled during a stage of the production run at which the overclad tube 14 is collapsing on the core rod 12 within the half of the length L of the assembled body proximate the lower and leading end 18b. More preferably, the interface gap pressure is cycled during a stage of the production run at which the overclad tube 14 is collapsing on the core rod 12 within the one third of the length L of the assembled body 18 proximate the lower and leading end 18b. Most preferably, the interface gap pressure is cycled during a stage of the production run at which the overclad tube 14 is collapsing on the core rod 12 within the one quarter of the length L of the assembled body 18 proximate the lower and leading end 18b.

In another embodiment, the treatment process (i.e., cycling of the interface gap pressure) is performed during an end stage of the drawing process/run. Preferably, the end stage of the drawing process/run corresponds to a point in the drawing process/run at which a second half of the assembled body 18 is proximate to and passing through the hot zone 26 of the drawing tower 20. Again, the treatment gas flows through the interface gap 30 along the entire remaining length L of the assembled body 18. However, cycling of the interface gap pressure toward the end stage of the drawing process/run has also been found to result in significantly improved optical fiber preforms or optical fibers, since metallic impurities or atomic defects present in undesirable oxidation states tend to be prominent during the end of the drawing process/run.

More particularly, in such an embodiment, cycling of the interface gap pressure is preferably carried out during heating of a second half of the length L of the assembled body 18 proximate the upper and trailing end 18a. That is, the interface gap pressure is preferably cycled during a stage of the production run at which the overclad tube 14 is collapsing on the core rod 12 within the half of the length L of the assembled body proximate the upper and trailing end 18a. More preferably, the interface gap pressure is cycled during a stage of the production run at which the overclad tube 14 is collapsing on the core rod 12 within the one third of the length L of the assembled body 18 proximate the upper and trailing end 18a. Most preferably, the interface gap pressure is cycled during a stage of the production run at which the overclad tube 14 is collapsing on the core rod 12 within the one quarter of the length L of the assembled body 18 proximate the upper and trailing end 18a.

In another embodiment, cycling of the interface gap pressure is performed at the beginning stages of the drawing process/run and then again at the end stages of the drawing process/run. In another embodiment, the pressure of the interface gap 30 is cycled a repeated number of times or continuously throughout the drawing process during collapsing of the overclad tube 14 on the core rod 12, by intermittently drawing a vacuum to evacuate gases (i.e., decreasing the pressure), providing a treatment gas (i.e., increasing the pressure), drawing a vacuum to evacuate reaction products (i.e., decreasing the pressure), and so on.

For any of these embodiments, it will be understood by those skilled in the art that the duration for which treatment gas is passed through the interface gap 30 may vary depending on the reaction kinetics of the particular oxidizing/reducing gas being used and the particular type of contaminants present in the interface gap 30. It will also be understood that the flow rate of the treatment gas is dependent upon the particular type of treatment gas being used, as well as the overall size of the interface gap 30. It will further be understood that the duration of the treatment gas flow must be sufficiently limited so as not to interfere with the collapsing process, to maintain a sufficient vacuum to support the core rod 12, and to ensure that the geometry of the core rod 12 is maintained.

EXAMPLE 1

An optical fiber preform was made in accordance with the drawing process/run graphically depicted in FIG. 4. The starting assembled body included a core rod made of pure quartz glass doped with germanium and fluorine inserted within an overclad tube made of pure quartz glass. The assembled body was then continuously fed through a drawing tower and heated zone-wise therein to cause the overclad glass tube to collapse on and adhere to the glass core rod.

At the beginning of the process/run, the interface gap pressure was maintained at a pressure of approximately 0 millibars gauge and, after approximately 13 minutes, the start/drop piece was pinched off to seal the lower leading end 18b. The interface gap pressure then began to rise and thus the controller prompted the vacuum source 50 to commence operation. An initial vacuum was subsequently drawn to decrease the interface gap pressure to a nominal vacuum pressure of approximately −930 millibars, shown as $P_2$ on FIG. 4. Upon reaching −930 millibars, the controller switched to a treatment flow control mode to flow a treatment gas, particularly oxygen-enriched air with an oxygen content of approximately 40%, through the interface gap 30. The flow of the treatment gas caused the pressure of the gap to increase. Once the interface gap pressure reached approximately 0 millibars gauge, shown as $P_3$ on FIG. 4, the flow of the treatment gas was adjusted to maintain this interface gap pressure and the treatment gas was flowed through the interface gap at an adjusted flow rate for approximately 3 minutes. After 3 minutes had elapsed, the treatment steps were repeated.

Specifically, a vacuum was again drawn to decrease the interface gap pressure to approximately −930 millibars, the treatment gas was then again flowed through the interface gap to increase the pressure to approximately 0 millibars, flow of the treatment gas was adjusted to maintain an interface gap pressure of approximately 0 millibars, the treatment gas was flowed through the interface gap 30 for approximately 3 at the adjusted flow rate, and finally a vacuum was once again drawn to re-established a vacuum pressure of approximately −950 millibars for the duration of the drawing process/run.

EXAMPLE 2

An optical fiber preform was made in accordance with the drawing process/run graphically depicted in FIG. 5. The starting assembled body was the same as that used for Example 1. The assembled body was then continuously fed through a drawing tower and heated zone-wise therein to cause the overclad glass tube to collapse on and adhere to the glass core rod.

The treatment process was carried out during the end stages of the drawing process/run, particularly during a stage at which a portion of the assembled body proximate the trailing end 18a of the body 18 was being heated. Prior to the treatment process, formation of the optical fiber preform (i.e., toward the leading end of the body) was conducted at a vacuum pressure of approximately −950 millibars in order to maintain the geometry of the assembled body.

To commence the treatment process, the controller switched from a vacuum control mode to a treatment flow control mode, such that a treatment gas, particularly standard air, was flowed through the interface gap 30 to increase the interface gap pressure to a set point $P_3$ of approximately 0 millibars. The flow of the treatment gas was then adjusted to maintain the 0 millibars interface gap pressure and the treatment gas was flowed through the interface gap at an adjusted flow rate for approximately 1 minute. After 1 minute had elapsed, a vacuum was drawn to decrease the interface gap pressure to a set point $P_2$ of approximately −930 millibars. Then, the treatment steps were repeated.

Specifically, the treatment gas was again flowed through the interface gap to cycle the interface gap pressure back up to approximately 0 millibars, the treatment gas flow rate was again adjusted to maintain the 0 millibars interface gap pressure, the treatment gas was flowed through the interface gap for approximately 1 minute at an adjusted flow rate, and a vacuum was once again drawn. The interface gap was maintained at the nominal vacuum pressure of approximately −930 millibars for approximately 10 minutes, then increased to approximately 0 millibars by once again flowing treatment gas through the interface gap, and finally decreased to the vacuum pressure of approximately −950 millibars for the remainder of the drawing process/run.

EXAMPLE 3

An optical fiber preform was made in accordance with the drawing process/run graphically depicted in FIG. 6. The drawing process was essentially a combination of the processes described for Examples 1 and 2. Specifically, treating of the assembled body was carried out at the beginning stages of the drawing process/run (i.e., during a stage at which portions of the assembled body proximate the leading end of the assembled body were being heated and collapsed) and then again at the end stages of the drawing process/run (i.e., during a stage at which portions of the assembled body proximate the trailing end of the assembled body were being heated and collapsed). The treatment gas used was standard air.

In all embodiments of the treatment process, undesirable organic and inorganic contaminants were removed, and visual defects and impurities, such as interface bubbles, air lines, inclusion of foreign matter, cloudy interface portions, and other defects caused by the contaminants were reduced or prevented in the resulting preform 28. In all embodiments of the treatment process, attenuation caused by such defects and impurities in the resulting optical fiber was also reduced.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of manufacturing an optical fiber preform or an optical fiber, the method comprising the steps of:
   (a) providing a glass tube and a glass core rod;
   (b) inserting the glass core rod into the glass tube to form an assembled body;
   (c) heating the assembled body to cause the glass tube to collapse on and adhere to the glass core rod; and
   (d) treating a first interface gap between the glass core rod and the glass tube during heating of at least a portion of the assembled body by:
      (i) establishing a vacuum pressure in the first interface gap,
      (ii) increasing a pressure of the first interface gap by flowing oxygen-enriched air through the first interface gap for a predetermined time,
      (iii) oxidizing contaminants present in the first interface gap by reaction of the oxygen-enriched air with the contaminants to produce reaction gases, and
      (iv) re-establishing a vacuum pressure in the first interface gap after the predetermined time has elapsed to remove the reaction gases from the first interface gap, wherein a chlorine containing gas is not introduced into the first interface gap.

2. The method according to claim 1, wherein the oxygen-enriched air comprises approximately 30% to approximately 50% oxygen.

3. The method according to claim 1, wherein the oxygen-enriched air comprises approximately 40% oxygen.

4. The method according to claim 1, wherein an entire length of the assembled body is heated zonewise, the heating beginning at a first leading end of the assembled body and terminating at an opposing second trailing end of the assembled body.

5. The method according to claim 4, further comprising sealing the first leading end of the assembled body and establishing a vacuum pressure in the first interface gap prior to heating of the assembled body.

6. The method according to claim 4, wherein treating of the first interface gap is performed during heating of a portion of the assembled body proximate the first leading end of the assembled body.

7. The method according to claim 4, wherein treating of the first interface gap is performed during heating of a portion of the assembled body proximate the second trailing end of the assembled body.

8. The method according to claim 1, further comprising repeating the step of treating the first interface gap.

9. The method according to claim 1, wherein the oxygen-enriched air is flowed through the first interface gap for approximately 10 seconds to approximately 5 minutes after the first interface gap pressure reaches approximately 0 millibars gauge.

10. The method according to claim 1, wherein the oxygen-enriched air is flowed through the first interface gap for approximately 30 seconds to approximately 3 minutes after the first interface gap pressure reaches approximately 0 millibars gauge.

11. The method according to claim 1, wherein the oxygen-enriched air is flowed through the first interface gap for approximately 3 minutes after the first interface gap pressure reaches approximately 0 millibars gauge.

12. The method according to claim 1, further comprising providing a glass jacket around the assembled body to form a second interface gap and heating the assembled body and glass jacket to cause the glass jacket to collapse on and adhere to the assembled body.

13. The method according to claim 12, further comprising treating the second interface gap during heating by:
   (i) establishing a vacuum pressure in the second interface gap,
   (ii) increasing a pressure of the second interface gap by flowing oxygen-enriched air through the second interface gap for a predetermined time, and
   (iii) re-establishing a vacuum pressure in the second interface gap after the predetermined time has elapsed.

14. A method of manufacturing an optical fiber preform or an optical fiber, the method comprising the steps of:
   (a) providing a glass tube and a glass core rod;
   (b) inserting the glass core rod into the glass tube to form an assembled body, the assembled body having a first leading end and an opposing second trailing end;
   (c) collapsing the glass tube on the glass core rod by heating a length of the assembled body beginning at the first leading end of the assembled body; and
   (d) treating a first interface gap between the glass core rod and the glass tube during collapsing of the glass tube on the glass core rod by:
      (i) establishing a vacuum pressure in the first interface gap during collapsing of the glass tube on the glass core rod proximate the second trailing end of the assembled body,
      (ii) increasing a pressure of the first interface gap by flowing a treatment gas through the first interface gap for a predetermined time during collapsing of the glass tube on the glass core rod proximate the second trailing end of the assembled body,
      (iii) oxidizing contaminants present in the first interface gap by reaction of the treatment gas with the contaminants to produce reaction gases, and
      (iv) re-establishing a vacuum pressure in the first interface gap during collapsing of the glass tube on the glass core rod proximate the second trailing end of the assembled body to remove the reaction gases from the first interface gap,
      wherein a chlorine containing gas is not introduced into the first interface gap.

15. The method according to claim 14, further comprising sealing the first leading end of the assembled body and establishing a vacuum pressure in the first interface gap prior to heating of the length of the assembled body.

16. The method according to claim 14, wherein the treatment gas is at least one of air, dry air, oxygen-enriched air, mixture of pure nitrogen and oxygen, and pure oxygen.

17. The method according to claim 14, further comprising repeating the step of treating the first interface gap.

18. The method according to claim 14, wherein the treatment gas is flowed through the first interface gap from approximately 10 seconds to approximately 3 minutes after the first interface gap pressure reaches approximately 0 millibars gauge.

19. The method according to claim 14, wherein the treatment gas is flowed through the first interface gap from approximately 30 seconds to approximately 2 minutes after the first interface gap pressure reaches approximately 0 millibars gauge.

20. The method according to claim 14, wherein the treatment gas is flowed through the first interface gap for approximately 1 minute after the first interface gap pressure reaches approximately 0 millibars gauge.

21. The method according to claim 14, wherein the step of treating the first interface gap is performed during heating of one half of the length of the assembled body proximate the second trailing end of the assembled body.

22. The method according to claim 21, wherein the step of treating the first interface gap is performed during heating of one quarter of the length of the assembled body proximate the second trailing end of the assembled body.

23. The method according to claim 21, wherein the step of treating the first interface gap is performed during heating of one third of the length of the assembled body proximate the second trailing end of the assembled body.

24. The method according to claim 14, further comprising providing a glass jacket around the assembled body to form a second interface gap and heating the assembled body and glass jacket to cause the glass jacket to collapse on and adhere to the assembled body.

25. The method according to claim 24, further comprising treating the second interface gap during heating by:
   (i) establishing a vacuum pressure in the second interface gap,
   (ii) increasing a pressure of the second interface gap by flowing oxygen-enriched air through the second interface gap for a predetermined time, and
   (iii) re-establishing a vacuum pressure in the second interface gap after the predetermined time has elapsed.

* * * * *